United States Patent [19]

Nakayama

[11] Patent Number: 4,981,347
[45] Date of Patent: Jan. 1, 1991

[54] ELECTRICALLY DRIVING SYSTEM FOR FOLDABLE OUTER REARVIEW MIRRORS OF MOTOR VEHICLE

[75] Inventor: Kiyoshi Nakayama, Shizuoka, Japan

[73] Assignee: Murakami Kameido Co., Ltd., Shizuoka, Japan

[21] Appl. No.: 187,946

[22] Filed: Apr. 29, 1988

[30] Foreign Application Priority Data

Apr. 30, 1987 [JP] Japan .............................. 62-64206[U]

[51] Int. Cl.$^5$ .............................................. B60R 1/06
[52] U.S. Cl. .................................... 350/604; 350/606;
 350/637; 318/466; 318/484; 361/31; 361/166;
 361/194; 361/195; 307/10.1
[58] Field of Search ............... 350/604, 606, 611, 612,
 350/626, 637; 307/10.1; 318/445, 466, 484;
 361/23, 24, 27, 31, 195, 194, 166

[56] References Cited

U.S. PATENT DOCUMENTS

| | | | |
|---|---|---|---|
| 3,117,254 | 1/1964 | Luce | 361/195 |
| 4,037,316 | 7/1977 | Stoll | 361/27 |
| 4,626,084 | 12/1986 | Kumai | 350/604 |
| 4,681,409 | 7/1987 | Enomoto | 350/637 |
| 4,798,967 | 1/1989 | Yamana et al. | 350/637 |

FOREIGN PATENT DOCUMENTS

| | | | |
|---|---|---|---|
| 0213540 | 12/1984 | Japan | 350/637 |
| 61-105247 | 5/1986 | Japan | 350/604 |
| 61-113533 | 5/1986 | Japan | . |
| 0193948 | 8/1986 | Japan | 350/637 |
| 0215142 | 9/1986 | Japan | 350/604 |
| 0218452 | 9/1986 | Japan | 350/604 |

Primary Examiner—Bruce Y. Arnold
Assistant Examiner—R. D. Shafer
Attorney, Agent, or Firm—Michael J. Striker

[57] ABSTRACT

An electrically driving system for the outer rearview mirror erects or folds the mirror body by the operation switch for rotating the incorporated motor normally or reversively. The system comprises a momentary operation switch, normal and reverse relays and limit switches for disconnecting self-holding circuits of the relays and motors from a power source independently of one another by detecting erected and folded states of the mirror. When the normal or reverse relay is rendered operative by the momentary operation switch, the incorporated motors are driven to cause rotation of a plurality of the mirrors. The mirrors are stopped independently with disconnection of motor circuit caused by the action of the limit switches when they reach to the erected or folded state.

9 Claims, 6 Drawing Sheets

ELECTRICALLY DRIVING SYSTEM FOR FOLDABLE OUTER REARVIEW MIRRORS OF MOTOR VEHICLE

BACKGROUND OF THE INVENTION

1. Field of the Invention

This invention relates to rearview mirrors and, more particularly, to an electrically driving system for foldable outer rearview mirrors of a motor vehicles.

2. Description of the Prior Art

Outer rearview mirrors are suitably folded to reduce their length when parking or storing motor vehicles. Recently, there are electrically foldable outer rearview mirrors which are driven by reversible motors provided in their body. A driving device of such outer rearview mirrors includes an operation switch for switching the direction of current of the reversible motors. While the operation switch is held at a folding position, the mirrors are turned toward a folded state. On the other hand, while the switch is held at an erecting position, the mirrors are turned toward an erected state. When the mirrors are turned to a predetermined position, they can be held stationary at that position by releasing the operation switch.

There has been realized a drive system, in which relays and self-holding circuits are provided to let the motors be rotated and stopped indirectly in response to operate a switch instead of rotating and stopping the motors directly by operating a switch. Such an improved drive system is disclosed in Japanese Patent Application Laid-Open No. Sho 61-113533. In this system, a motor circuit for each of the right and left mirror bodies includes a first self-holding circuit which is rendered operative when turning the mirror body from the folded state to the erected state and a second self-holding circuit which is rendered operative when turning the mirror body from the erected state to the folded state. When the mirror body reach to either of these states, a limit switch is operated to release a self-holding state so as to automatically stop the motor. In this drive system, however, the limit switches for detecting the erected and folded states of the right and left mirrors can only render operating relays no-exciting, that is, they can not render both relays and motors inoperative. Besides, it is necessary to provide normal and reverse relays and self-holding circuits for each of the right and left reversible motors. Therefore, the overall circuit is complicated, is inevitably large in size, requires a large number of assembling steps and dictates high cost of manufacture.

An object of the invention is to provide an electrically driving system for foldable outer rearview mirrors for a motor vehicle, which is reduced in size and weight by reducing the number of relays used.

Another object of the invention is to provide an electrically driving system for foldable outer rearview mirrors, which ensures accurate erecting and folding operations and can be provided at low cost.

SUMMARY OF THE INVENTION

According to the invention, a normal relay and reverse relay are provided commonly to right and left side drive motors, and both the relays and motors are simultaneously disconnected by limit switches detecting the erected and folded states of the mirrors.

According to the invention, there is provided a system, which comprises foldable rearview mirrors, reversible drive electric motors each provided in the body of each mirror, a momentary switch as operation switch, a relay circuit including normal and reverse relays operable by the momentary switch, a first self-holding circuit for holding the normal relay operative, a second self-holding circuit for holding the reverse relay operative, and detecting means for disconnecting either one of the self-holding circuit and the motors from a power source when the mirrors reach to either erected or folded state. As the detecting means limit switches are used, which are connected in series with the respective motor circuits. Throughout the specification, by the term "normal" is meant the direction of turning of the mirrors from the folded state to the erected state, and by the term "reverse" is meant the direction of turning from the erected state to the folded state.

The relay circuit includes means for preventing each of relays from operating relatively to another relays, that is, means for inhibiting the simultaneous operation of other relay in which the break contact for the reverse relay is connected in series with the normal relay and the break contact for the; normal relay is connected in series with the reverse relay. When the normal relay is rendered operative by the momentary switch connected in series with both the normal and reverse relays, the momentary break contact switch connected to the reverse relay is turned off. When the reverse relay is rendered operative, the momentary break contact switch connected to the normal relay is turned off. Further, the relay circuit may include a transistor, connected in series with the normal and reverse relays and is adapted to be held operative for a predetermined period of time by charge acquired when the momentary switch as operation switch is operated.

With the above construction according to the invention, the normal or reverse relay is rendered operative by operating the momentary switch, whereby motors provided in respective mirrors are driven. When the mirrors are driven to erected or folded state according to the rotation of the motors, the motors are disconnected from a power source by the action of limit switches, so that the mirrors are held stationary in that state separately.

DESCRIPTION OF THE PREFERRED EMBODIMENTS

Figure 1:
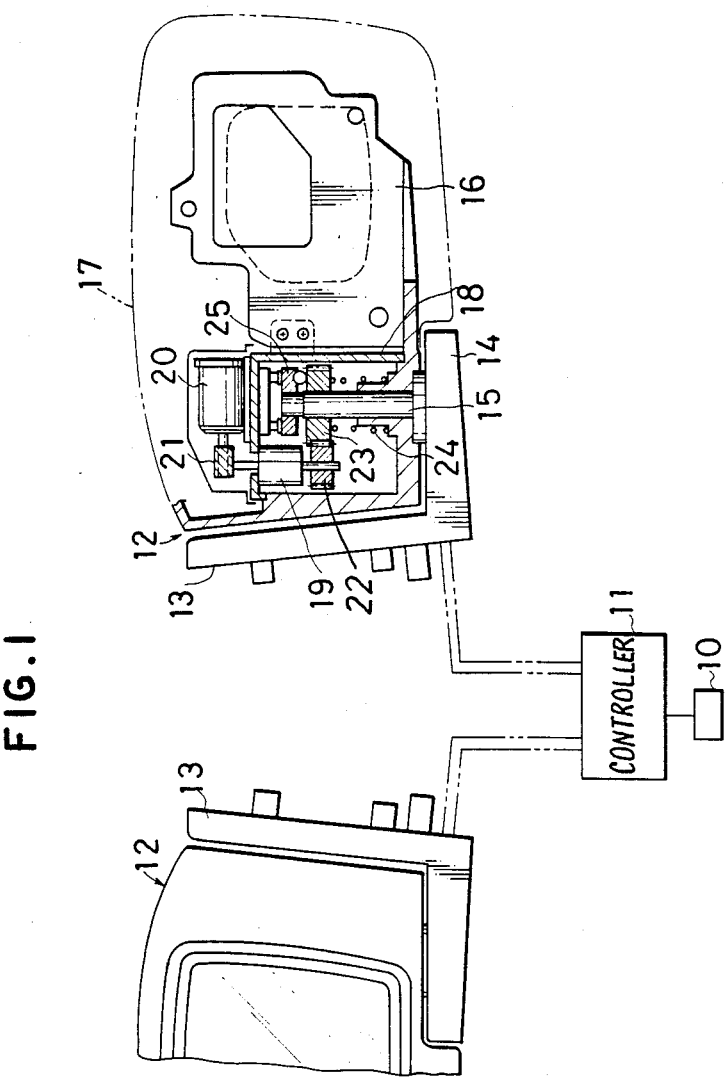
FIG. 1 is a schematic front view showing a foldable outer rearview mirror embodying the invention.

The present invention will now be described in detail with reference to the drawings. Referring first to FIG. 1, there is shown a system for driving foldable outer rearview mirrors suited for use with a motor vehicle.

The system includes an operation switch 10 provided in a vehicle compartment, a controller 11 and right and left mirror 12. Each mirror 12 includes a shaft 15 provided upright on an extension 14 of a base 13, a frame 16 rotatably supported to the shaft 15, a mirror body 17, a gear box 18 provided in a rotary part of the frame 16 near the shaft, a reduction gear mechanism 19 provided in the gear box 18 and an electric motor 20 for folding a mirror secured to the top of the gear box 18. The reduction gear mechanism 19, as shown in FIG. 1, consists of a reduction gear train connected to a worm gear 21 mounted to a motor output shaft, and its end gear 22 is in mesh with a clutch gear 23 mounted on the shaft 15. The clutch gear 23 is spring-biased by a resilience of a spring 24 toward a clutch retainer 25 secured to the shaft top.

The mechanism and the function of the end gear 22, the clutch gear 23, the spring 24 and the clutch retainer 25 is known by a description of U.S. Pat. No. 4,626,084 patented on Dec. 2, 1986.

Figure 2:
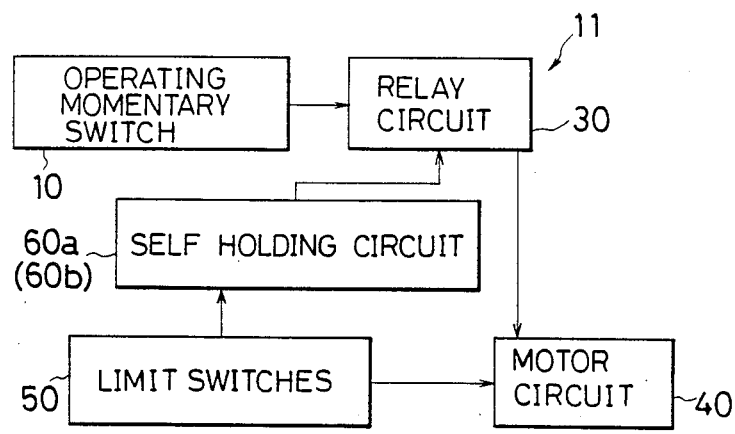
FIG. 2 is a block diagram showing system for driving rearview mirrors according to the invention.

FIG. 2 shows a block diagram of a controller 11. In this block diagram, numeral 10 designates a see-saw switch to be an operation momentary switch, numeral 30 designates a relay circuit, numeral 40 designates a motor circuit, numeral 50 designates limit switches for detecting both of an erected state and a folded state, numeral 60a designates a self-holding circuit for holding the normal relay and numeral 60b designates a self-holding circuit for holding the reverse relay.

Figure 3:
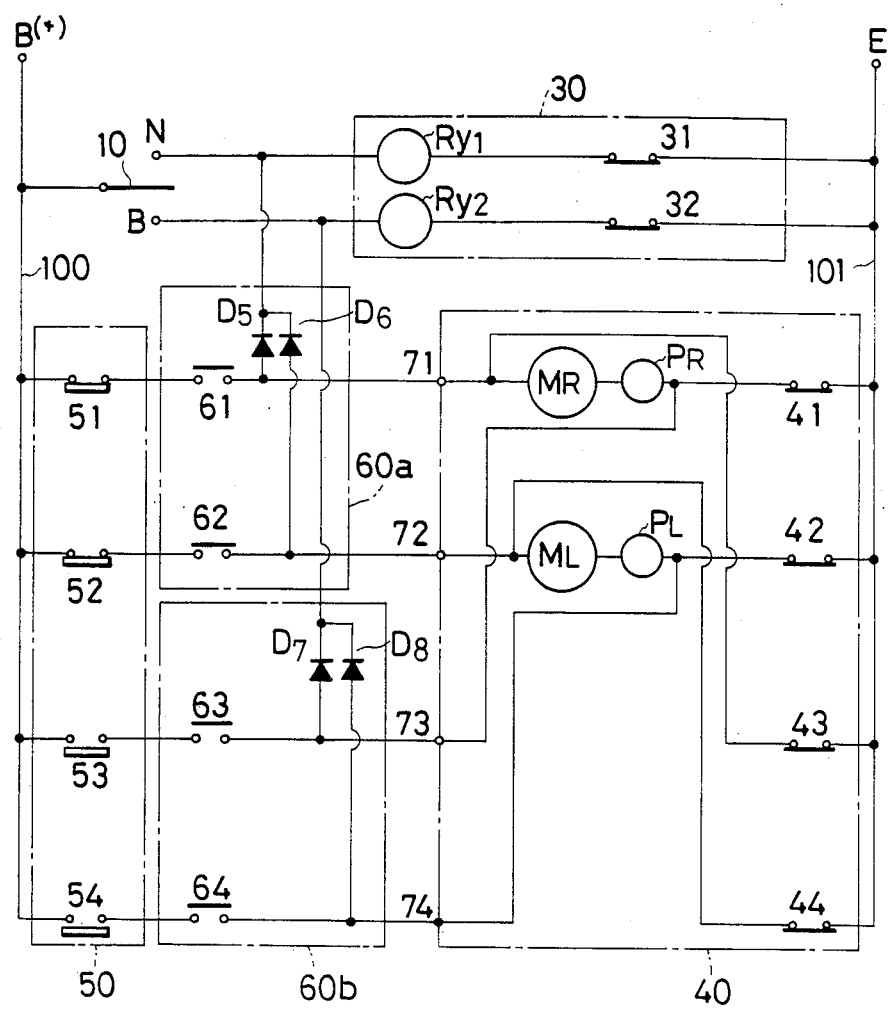
FIG. 3 is a circuit diagram showing a first embodiment of the system according to the invention.

FIG. 3 is a circuit diagram showing an embodiment of the system according to the invention. The illustrated system includes a see-saw switch 10 having an erecting contact N and a folding contact B. The system also includes a relay circuit 30 having a normal relay Ry1, a reverse relay Ry2 and break contacts 31 and 32 for inhibiting simultaneous operation of -other relay. The break contact 31 which is connected in series with the relay Ry1 is turned off when the other relay Ry2 is operated. The break contact 32 in series with the other relay Ry2 is turned off when the relay Ry1 is operated. The system further includes a motor circuit 40 having parallel electric motors $M_R$ and $M_L$ in parallel with each other for folding right and left mirror bodies, overcurrent limitation posisters $P_R$ and $P_L$, e.g., positive characteristic thermistors, connected in series with the respective motors and relay-break contacts 41 to 44 for preventing simultaneous excitation of the normal and reverse relays. When the reverse relay Ry2 is rendered operative, the break contacts 41 and 42 are turned off, while the break contacts 42 and 43 are turned off when the forward relay Ry1 is operated. Reference numerals 71 to 74 designate input terminals, numeral 100 designates a positive power supply line, and numeral 101 designates a negative power supply line.

The system further includes a limit switch circuit 50 having limit switches 51 and 52 which detect the erected state of the respective right and left mirrors and limit switches 53 and 54 which detect the folded state of the respective right and left mirror. These limit switches are provided in the top surface of the extension 14 shown in FIG. 1. These limit switches are connected in parallel and comprise of break contacts so that they are normally closed unless they are detecting the given state.

The limit switch 51 is connected to the terminal 71 for a right motor in a motor circuit 40 through the intermediary of a make contact 61 for a normal relay, the limit switch 52 is connected to the terminal 72 for a left motor in a motor circuit 40 through the intermediary of a make contact 62 for a normal relay, the limit switch 53 is connected to the terminal 73 for a right motor in a motor circuit 40 through the intermediary of a make contact 63 for a reverse relay and the limit switch 54 is connected to the terminal 74 for a left motor in a motor circuit 40 through the intermediary of a make contact 64 for a reverse relay.

The system further includes a self-holding circuit including normal and reverse relay self-holding circuits 60a and 60b. The normal relay self-holding circuit 60a includes a first circuit for the relay Ry1 consisting of the make contact 61 and a diode D5 connected in series with the limit switch 51 and a second circuit for the relay Ry2 consisting of the make contact 62 and a diode D6 connected in series with the limit switch 52. The reverse relay self-holding circuit 60b includes a third circuit for the relay Ry1 consisting of the make contact 63 and a diode D7 connected in series with the limit switch 53 and a fourth circuit for the relay Ry2 consisting of the make contact 64 and a diode D8 connected in series with the limit switch 54. In the illustrated example, two relay make contacts and two diodes are provided in each self-holding circuit for controlling two motors. Where three or more motors are used, each self-holding circuit will have relay make contacts and diodes corresponding in number to the number of motors provided, and three or more pair of limit switches for detecting the state of the mirror and break contacts in a motor circuit are also provided (not shown).

Now, the operation of the embodiment shown in FIG. 3 will be described.

FIG. 3 shows a connection state when both the right and left outer rearview mirrors are in the folded state, that is, the limit switch 53, 54 is turned off. When the see-saw switch 10 as momentary switch of operation is thrown to the electing contact N in above state, the normal relay Ry1 is rendered operative, so that in the self-holding circuit 60a two parallel circuits are formed as follows;

(1) ... positive power supply line B(+)→ limit switch 51→ make contact 61→ diode D5→ relay Ry1

(2) ... positive power supply line B(+)→ limit switch 52→ make contact 62→ diode D6→ relay Ry2

In this state, the limit switches 51 and 52 .and a break contact 31 are "on", so that the normal relay Ry1 is self-held. The positive power supply line then is also connected to the motor circuit to form two other circuits as follows;

(3) ... positive power supply line B(+)→ limit switch 51→ make contact 61→ terminal 71→ motor $M_R$→ posister $P_R$→ break contact 41→ negative power supply line E (4) ... positive power supply line B(+)→ limit switch 52→ make contact 62→ terminal 72→ motor $M_L$→ posister $P_L$→ break contact 42→ negative power supply line E As a result, the right and left side motors $M_R$ and $M_L$ are driven, so that the right and left outer rearview mirrors simultaneously start rotation.

When the see-saw switch 10 is switched to the side of the folding contact B after the right and left mirrors have been erected, since the limit switch 54 and break contact 32 are both "on", the reverse self-holding circuit 60b is rendered operative, so that the reverse relay Ry2 is self-held. At the same time, the terminals 73 and 74 for the reverse circuit for the right and left side motor are connected to the positive power supply line. The motors $M_R$ and $M_L$ are thus driven reversely to cause rotation of the right and left mirrors toward the folding direction.

When the mirrors reach to the folded state, the limit switches 54 and 55 are successively turned off to stop the left side motor $M_L$ and then the right side motor $M_R$. At the same time, the reverse relay Ry2 is released from the self-holding to fold the right and left mirrors in a folded state.

In this case, in the relay circuit 30 the break contact 31 of the reverse relay Ry2 is connected in series with the normal relay Ry1 while the break contact 32 of the relay Ry1 is connected in series with the relay Ry2. Therefore, even if the see-saw switch 10 is closed to operate the other relay than the operative one, the switch output is not accepted.

Figure 4:
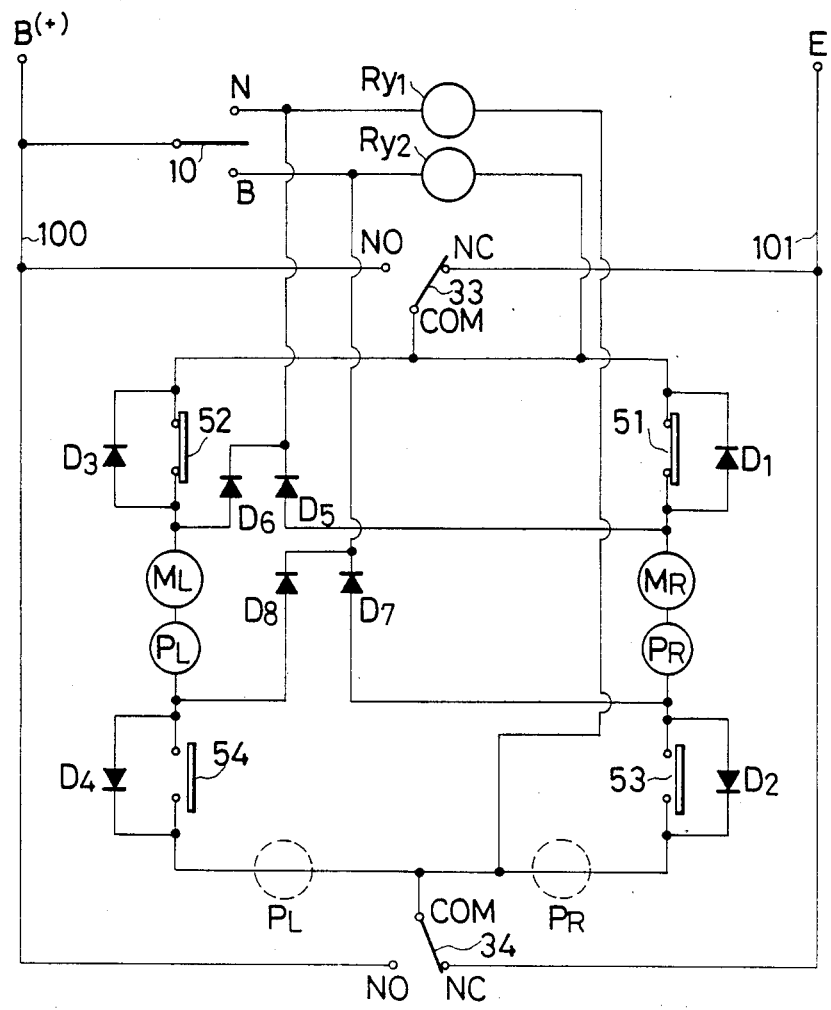
FIG. 4 is a circuit diagram showing a second embodiment of the invention, which has a reduced number of relay contacts compared to that in the circuit shown in FIG. 3.

FIG. 4 shows a modification of the circuit shown in FIG. 3. In this instance, transfer contacts 33 and 34 are used effectively in lieu of the break contact 32 and break contact 31 for the normal and reverse relays. More specifically, this modification has the same circuit structure as shown in FIG. 3 except for that the transfer contacts 34 and 33 are connected in series with the respective normal and reverse relays Ry1 and Ry2. The posisters $P_R$ and $P_L$ may be provided at positions shown by dashed circles if this is desirable from the standpoint of actual provision of the circuit. In this case, the posisters are provided in the reverse relay self-holding circuit. This arrangement, however, poses no problem in use for the resistance of the posisters is ignorable compared to the coil resistance of the relays.

FIG. 4 and FIGS. 5 to 8 to be described later show the state of individual contacts when the right and left mirror are in the folded state.

In the circuit of FIG. 4, when the see-saw switch 10 is switched to the side of the erecting contact N, a circuit is formed as follows;

(5) ... positive power supply line B(+)→ relay Ry1→ normally closed contact NC of the transfer contact 34→ negative power supply line E Then the normal relay Ry1 is operated. Further, The electric current flows from the positive power supply line B(+) to the contact NO of transfer contact 33 and to the common contact COM of contact 33, and therefrom one branch flows to the relay Ry1 through the limit switch 51 and the diode D5 and another branch flows to the relay Ry1 through the limit switch 52 and the diode D6. Then the current flows through the relay Ry1, and via the normally closed contact NC of transfer contact 34 to the negative power supply line E.

The relay Ry1 is thus self-held. At the same time, a motor circuit is formed as follows;

The electric current flows from the positive power supply line B(+) to the contact NO of transfer contact 33 and therefrom the one branch flows to the normally closed contact NC of the transfer contact 34 through the limit switch 51, the right side motor MR, the posister PR and the guide D2, and the other branch flows to the normally closed contact NC of the transfer contact 34 through the limit switch 52, the left side motor ML, the posister PL and the diode D4. Then via the normally closed contact NC, the current flows to the negative power supply line E.

The motors $M_L$ and $M_R$ are thus simultaneously driven normally to cause rotation of the right and left mirrors in the erecting direction. When the left mirror attains the erected state, the limit switch 52 is turned off, thus disconnecting the circuit for driving the motor $M_L$. However, since the limit switch 51 is "on", the relay Ry1 is self-held to drive the motor $M_R$ continually rotating.

When the right mirror reaches to . the erected state, the limit switch 51 is turned off to disconnect the circuit for driving the motor $M_R$ and the self-holding circuit of the relay Ry1. The motor $M_R$ is thus stopped to stop the right mirror in the erected state. When the see-saw switch 10 is subsequently switched to the holding side terminal B, the right and left mirrors start rotation in the folding direction until they stay the folded state. This operation is substantially the same as in the preceding embodiment, so its description is not given.

The transfer contacts 33 and 34 noted above also have the role of the break contacts 31 and 32 in FIG. 3 for inhibiting the operation of the other relay than the associated one.

Figure 5:
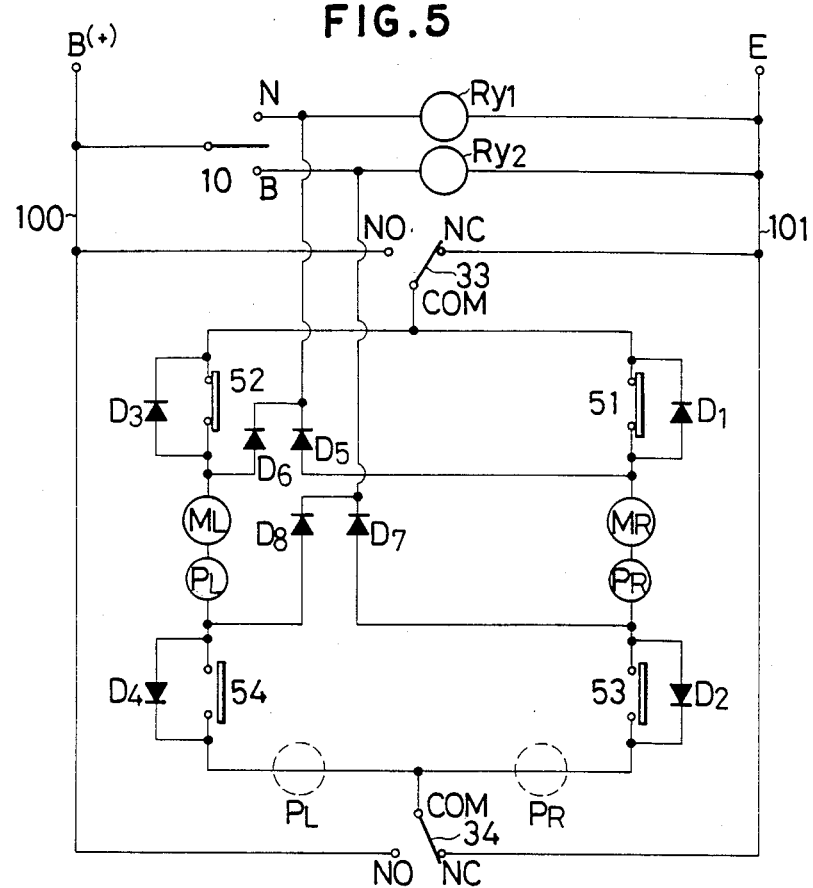
FIG. 5 is a circuit diagram showing a third embodiment of the invention.

FIG. 5 shows a third embodiment. This circuit is the same as the circuit of FIG. 4 except for that the normal and reverse relays Ry1 and Ry2 are connected in parallel with the respective transfer contacts 33 and 34. The normal operation is entirely the same as in the embodiment shown in FIG. 4. However, when the see-saw switch 10 is switched to the opposite side during operation, both the normal and reverse relays Ry1 and Ry2 are rendered operative, and also their self-holding circuits are formed for the limit switches 51 to 54 are all "on". Therefore, two motor circuits are formed as follows;

(8) ... positive power supply line B(+)→ contact NO of transfer contact 33→ limit switch 51→ motor $M_R$→ posister $P_R$→ limit switch 53→ contact NC of transfer contact 34→ negative power supply line E (9) ... positive power supply line B(+)→ contact NO of transfer contact 33→ limit switch 52→ motor $M_L$→ posister $P_L$→ limit switch 54→ contact NC of transfer contact 34→ negative power supply line E.

Thus, both the motor terminals are connected to the positive power supply line so that the motors are stopped. It is thus possible to effect emergency stop. To resume the operation in this case, the power source is once disconnected from the drive circuit and then reconnected, and then the see-saw switch 10 is operated again.

Figure 6:
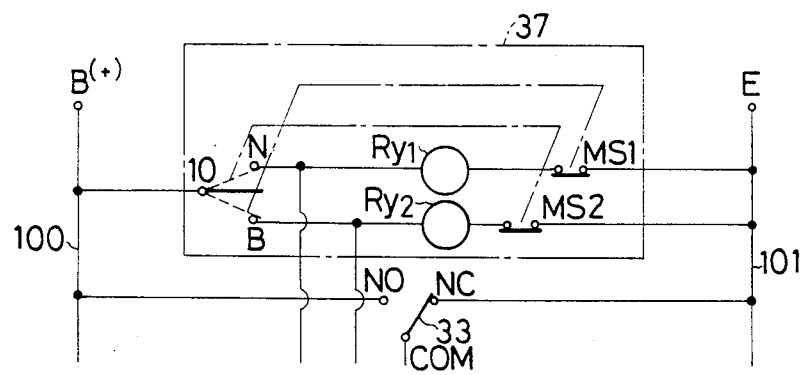
FIG. 6 is a circuit diagram showing a different embodiment of relay circuit.

FIG. 6 shows a modification of the relay circuit. In this instance, a momentary switch MS1 which is break contact is connected in series with the normal relay Ry1 in the relay circuit 37, and a momentary switch MS2, also break contact, is connected in series with the reverse relay Ry2. The momentary switch MS2 is turned off when the see-saw switch 10 is switched to the terminal N, while the momentary switch MS1 is turned off when the switch 10 is switched to the terminal B.

Figure 7:
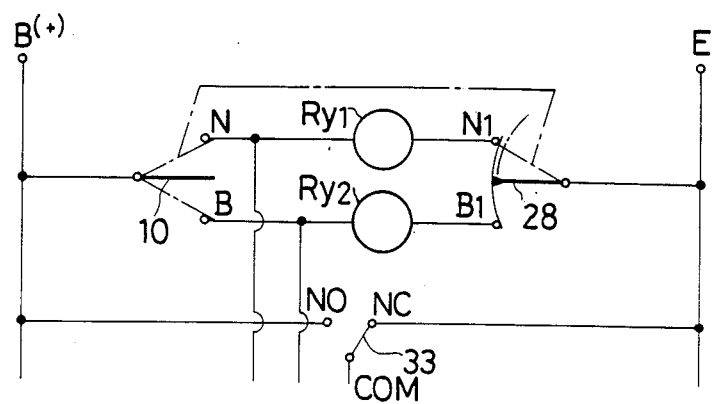
FIG. 7 is a circuit diagram showing a further different embodiment of the relay circuit.

FIG. 7 shows another modification of the relay circuit. In this instance, the relay circuit also includes a movable contact 28 having terminals N1 and B1 connected to the negative power supply line side of the respective relays Ry1 and Ry2 and interlocked to the switch 10. The movable contact 28 is constructed such that its terminals N1 and B1 are connected to each other at the position of neutral and when the see-saw switch 10 is thrown, said movable contact 28 is interlocked with said switch 10 to connect with respective terminals at the side where said switch 10 is thrown. In this case, the normal operation is the same as shown in FIG. 3. When the see-saw switch 10 is switched to the opposite side during operation, for instance, if the normal relay Ry1 is operative, the momentary switch MS1 which is the break contact is turned off to render the normal relay Ry1 inoperative and render the reverse relay RY2 operative, so that the direction of rotation of the mirrors is reversed. In this way, it is possible to switch the erecting or folding direction of rotation of the mirrors at any desired time.

Figure 8:
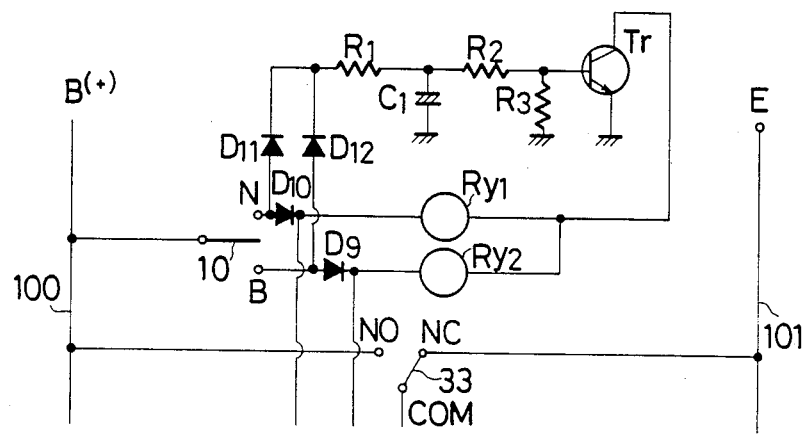
FIG. 8 is a circuit diagram showing an another further different embodiment of the relay circuit.

FIG. 8 shows a further modification of the relay circuit. In this circuit, a transistor Tr is connected in series with the normal and reverse relays Ry1 and Ry2, and, the base of the transistor Tr is connected to a charging/discharging circuit consisting of resistors R1 to R 3 and a capacitor C1 through respective diodes D11 and D12 to the erecting and folding contacts N and B of operation momentary switch. In this case, when the see-saw switch 10 is switched to the folding side contact B, the capacitor C1 which has been charged through the diode D12 and resistor R1 is discharged through the resistor R2 and then through the resistor R3 and base of the transistor Tr. The base thus is held at a "H" level for a preset period of time, and the reverse relay Ry2 can be held operative only during this period.

More specifically, if both the limit switches 53 and 54 for detecting the folded state are, turned off in the preset period of time noted above, the relay Ry2 is rendered inoperative at that time. If the limit switches are not turned off in the preset time period in case of an accident that the motor is locked, at the end of the preset time the potential on the base of the transistor Tr goes to "L" level to render the relay Ry2 inoperative. In this way, the circuit is protected without use of any poister.

As has been described in the foregoing, according to the invention the limit switches for detecting the erected and folded states of the mirrors act to release the self-holding of the mirror and at the same time disconnect the mirror drive motors from the power source. In case where a plurality of mirrors are simultaneously driven for rotation by a momentary switch and stopped independently when they reach to their erected or folded state, therefore, only a single pair of normal and reverse relays is necessary, whereas in the prior art the relay pair is required for each of motors mounted in respective mirrors. It is thus possible to reduce the size, weight and cost of the drive system.

I claim:

1. An electrically driving system for foldable outer rearview mirrors of motor vehicle comprising:
   a plurality of outer rearview mirror bodies foldably mounted on the outer sides of a motor vehicle;
   reversible electric motors each mounted in each of said mirror bodies;
   a momentary operation switch provided in a vehicle compartment for switching the direction of motor rotation;
   a relay circuit including a normal relay and a reverse relay, said relays being rendered operative in response to the actuation of said momentary operation switch;
   break contacts of said relays being connected for prohibiting simultaneous actuations of said relays;
   a self-holding circuit for said relays;
   a motor circuit; and
   limit switches for cutting-off said relay circuit and motor circuit by detecting an erected state and a folded state of said mirror bodies.

2. The system according to claim 1, wherein a break contact for the reverse relay is connected in series with the normal relay and a break contact for the normal relay is connected in series with the reverse relay.

3. The system according to claim 1, wherein said self-holding circuit includes a first self-holding circuit for said normal relay and a second self-holding circuit for said reverse relay, said first and second self-holding circuits each including a transfer contact to be switched from a closed state to an open state when the relay of the associated self-holding circuit is rendered operative.

4. The system according to claim 1, wherein said relay circuit further includes break contacts as momentary switches linked to said operation switch and connected in series with said respective normal and reverse relays.

5. The system according to claim 4, wherein said relay circuit further includes break contacts as momentary switches connected in series with said respective relays and self-holding circuits for said relays, the break contact in series with said reverse relay being turned off when said normal relay is rendered operative by said momentary operation switch, the break contact in series with said normal relay being turned off when said reverse relay is rendered operative.

6. The system according to claim 1, wherein said relay circuit further includes break contacts as momentary switches connected in series with said respective relays and self-holding circuits for said relays the break contact in series with said reverse relay being turned off when said normal relay is rendered operative by said momentary operation switch, the break contact in series with said normal relay being turned off when said reverse relay is rendered operative.

7. The system according to claim 1, wherein said motor circuit includes overcurrent limitation posisters in series with motors.

8. An electrically driving system for foldable outer rearview mirrors of motor vehicle comprising:
   a plurality of outer rearview mirror bodies foldably mounted on the outer sides of a motor vehicle;
   reversible electric motors each mounted in each of said mirror bodies;
   a momentary operation switch provided in a vehicle compartment for switching the direction of motor rotation;
   a relay circuit including a normal relay and a reverse relay, said relays being rendered operative in response to the actuation of said momentary operation switch;
   a self-holding circuit for said relays;
   a motor circuit;
   limit switches for cutting-off said relay circuit and motor circuit by detecting an erected state and a folded state of said mirror bodies; and wherein said relay circuit further includes a movable contact provided at a negative polarity side of said normal and reverse relays; and linked to said momentary operation switch, said movable contact is connected to the negative polarity side of said relays at a neutral state and when said momentary operation switch is actuated, said movable contact connects one of said relays.

9. An electrically driving system for foldable outer rearview mirrors of motor vehicle comprising:
a plurality of outer rearview mirror bodies foldably mounted on the outer sides of a motor vehicle;
reversible electric motors each mounted in each of said mirror bodies;
a momentary operation switch provided in a vehicle compartment for switching the direction of motor rotation;
a relay circuit including a normal relay and a reverse relay, said relays being rendered operative in response to the actuation of said momentary operation switch;
a self-bonding circuit for said relays;
a motor circuit;
limit switches for cutting-off said relay circuit and motor circuit by detecting an erected state and a folded state of said mirror bodies; and wherein said relay circuit further includes a transistor to be rendered operative for a predetermined period of time by charge acquired when said momentary operation switch is operated, said transistor being connected in series with said normal and reverse relays.

* * * * *